United States Patent

Dannheim et al.

Patent Number: 5,548,072
Date of Patent: Aug. 20, 1996

[54] WATER-SOLUBLE PHENYL AZO AMINOAPHTOL AZO COMPOUNDS CONTAINING A FIBRE-REACTIVE GROUP OF THE VINYLSULFONE SERIES AND A MORPHOLINO-FLUOROTRIAZINYL GROUP, SUITABLE AS DYESTUFFS

[75] Inventors: Jörg Dannheim, Frankfurt am Main; Dieter Oehme, Flörsheim; Horst Tappe, Dietzenbach, all of Germany

[73] Assignee: Hoechst Aktiengesellschaft, Frankfurt, Germany

[21] Appl. No.: 462,131

[22] Filed: Jun. 5, 1995

Related U.S. Application Data

[63] Continuation of Ser. No. 260,890, Jun. 16, 1994, abandoned.

[30] Foreign Application Priority Data

Jun. 17, 1993 [DE] Germany .................. 43 20 151.2

[51] Int. Cl.$^6$ .................. C09B 62/085; C09B 62/51; D06P 1/38
[52] U.S. Cl. .................. 534/635; 534/582; 8/549
[58] Field of Search .................. 534/635; 8/549

[56] References Cited

U.S. PATENT DOCUMENTS

| | | | |
|---|---|---|---|
| 4,649,193 | 3/1987 | Meininger et al. | 534/635 X |
| 5,097,021 | 3/1992 | Stohr et al. | 534/635 |
| 5,233,026 | 8/1993 | Tzikas | 534/635 X |

FOREIGN PATENT DOCUMENTS

| | | |
|---|---|---|
| 0177445 | 9/1985 | European Pat. Off. |
| 0308787 | 3/1989 | European Pat. Off. |

OTHER PUBLICATIONS

European Search Report No. 94109016.9, Sep. 27, 1994.

*Primary Examiner*—Fiona T. Powers
*Attorney, Agent, or Firm*—Connolly and Hutz

[57] ABSTRACT

Water-soluble azo compounds, preparation thereof and use thereof as dyes

There are described monoazo compounds conforming to the formula (1)

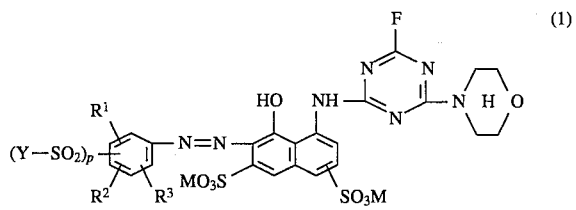

which are used as dyes having fiber-reactive properties for preparing strong, red, fast dyeings and prints on hydroxy- and/or carboxamido-containing material, in particular fiber material, such as wool and synthetic polyamide fibers and in particular cellulose fibers, such as cotton.

In the formula (1):

M is hydrogen or an alkali metal; $R^1$ is hydrogen or sulfo; $R^2$ is hydrogen, alkyl of 1 to 4 carbon atoms, alkoxy of 1 to 4 carbon atoms, sulfo, hydroxy, halogen or carboxy; $R^3$ is hydrogen, halogen, alkyl of 1 to 4 carbon atoms or alkoxy of 1 to 4 carbon atoms; Y is vinyl or is ethyl which contains in the β-position a substituent which is eliminable with alkali to form a vinyl group; p is 1 or 2; the one —SO$_3$M group is attached to the naphthalene ring para or meta to the amino group.

6 Claims, No Drawings

WATER-SOLUBLE PHENYL AZO AMINOAPHTOL AZO COMPOUNDS CONTAINING A FIBRE-REACTIVE GROUP OF THE VINYLSULFONE SERIES AND A MORPHOLINO-FLUOROTRIAZINYL GROUP, SUITABLE AS DYESTUFFS

This application is a continuation of application Ser. No. 08/260,890, filed Jun. 16, 1994, now abandoned.

U.S. Pat. Nos. 4,649,193 and 5,097,021 disclose monoazo dyes containing an amino-substituted fluorotriazine radical in the coupling component and a fiber-reactive radial of the vinyl sulfone series in the diazo component. It is true that these dyes have good fiber-reactive and application properties, but the practice of dyeing with fiber-reactive dyes requires in addition improvements in the quality of the properties of such dyes and of the dyeings and prints obtainable therewith and similarly an improved economy of the dyeing process involved in their use. There consequently continues to be a demand for novel fiber-reactive dyes whereby the art can be advanced.

The present invention now provides novel monoazo compounds having fiber-reactive properties, which conform to the formula (1)

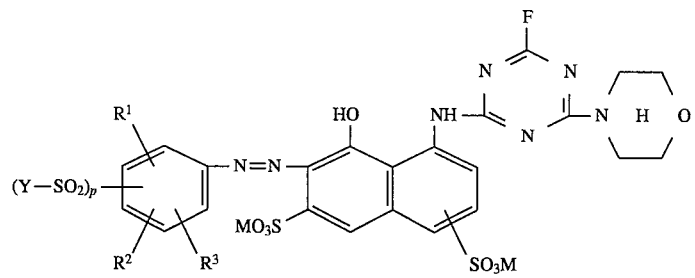

where

M is hydrogen or an alkali metal, such as sodium, potassium or lithium;

$R^1$ is hydrogen or sulfo;

$R^2$ is hydrogen, alkyl of 1 to 4 carbon atoms, such as ethyl and in particular methyl, alkoxy of 1 to 4 carbon atoms, such as ethoxy and in particular methoxy, sulfo, hydroxy, halogen, such as chlorine, bromine and fluorine, or carboxy, preferably hydrogen, methyl, methoxy or ethoxy;

$R^3$ is hydrogen, halogen, such as chlorine and bromine, alkyl of 1 to 4 carbon atoms, such as ethyl and in particular methyl, or alkoxy of 1 to 4 carbon atoms, such as ethoxy and in particular methoxy, preferably hydrogen, methoxy or ethoxy;

Y is vinyl or is ethyl which contains in the β-position a substituent which is eliminable with alkali to form a vinyl group;

p is 1 or 2;

the one —$SO_3M$ group is attached to the naphthalene ring para or meta to the amino group.

The monoazo compounds of the formula (1) can be present in the form of the free acid as well as in the form of their salts. They are preferably present in the form of their salts and preferably used in the form of their salts for dyeing and printing hydroxy- and/or carboxamido-containing materials, in particular fiber materials.

In the formula (1) and also in the formulae given hereinafter, the individual symbols can have, within the scope of their definition, meanings identical to or different from one another.

Alkali-eliminable substituents in the ethyl group of the radical Y include for example sulfato, thiosulfato, phosphato, alkanoyloxy of 2 to 5 carbon atoms, such as acetyloxy, benzyloxy, sulfobenzyloxy, p-toluenesulfonyloxy, halogen, such as chlorine, and dialkylamino having alkyl radicals of in each case 1 to 4 carbon atoms, such as dimethylamino and diethylamino, hereof preferably thiosulfato, acetyloxy and in particular sulfato. Similar preference is given to Y as vinyl.

The groups "sulfo", "carboxy", "thiosulfato", "phosphato" and "sulfato" include not only the acid form thereof but also the salt form thereof. Accordingly, sulfo groups are groups conforming to the formula —$SO_3M$, thiosulfato groups are groups conforming to the formula —S—$SO_3M$, carboxy groups are groups conforming to the formula —COOM, phosphato groups are groups conforming to the formula —$OPO_3M_2$, and sulfato groups are groups conforming to the formula —$OSO_3M$, in each of which M is as defined above.

Diazo components conforming to the radicals of the formula (2)

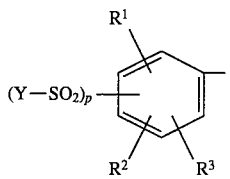

in the monoazo compounds of the formula (1) include for example 4-(β-sulfatoethylsulfonyl)phenyl, 4-(β-thiosulfatoethylsulfonyl)phenyl, 4-vinylsulfonylphenyl, 4-(β-chloroethylsulfonyl)phenyl, 3-(β-sulfatoethylsulfonyl)phenyl, 3-vinylsulfonylphenyl, 2-methoxy-5-(β-sulfatoethylsulfonyl)phenyl, 2-methoxy-5-(β-thiosulfatoethylsulfonyl)phenyl, 2-methoxy-5-vinylsulfonylphenyl, 4-methoxy-3-(β-sulfatoethylsulfonyl)phenyl, 4-methoxy-3-vinylsulfonylphenyl, 2,5-dimethoxy-4-(β-sulfatoethylsulfonyl)phenyl, 2,5-dimethoxy-4-vinylsulfonylphenyl, 2,5-dimethoxy-4-(β-sulfatoethylsulfonyl)phenyl, 2-carboxy-5-(β-sulfatoethylsulfonyl)phenyl, 2-carboxy-5-vinylsulfonylphenyl, 2-sulfo-4-(β-sulfatoethylsulfonyl)phenyl, 2-sulfo-4-vinylsulfonylphenyl, 2,4-disulfo-5-vinylsulfonylphenyl, 2-hydroxy-5-β-sulfatoethylsulfonylphenyl, 2-hydroxy-4-(β-sulfatoethylsulfonyl)phenyl, 3-sulfo-2-hydroxy-5-(β-sulfatoethylsulfonyl)phenyl, 2-bromo-4-(β-sulfatoethylsulfonyl)phenyl and 2,6-dichloro-4-(β-sulfatoethylsulfonyl)phenyl.

The present invention further relates to a process for preparing the monoazo compounds of the formula (1) according to the invention, which comprises diazotizing a compound of the formula (3)

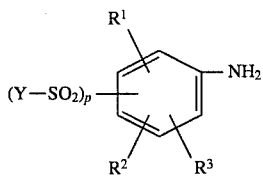

where Y, $R^1$, $R^2$, $R^3$ and p are each as defined above, and coupling the resulting diazonium compound with a compound conforming to the formula (4)

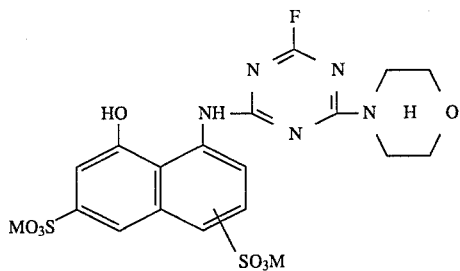

where M is as defined above.

The diazotization reaction of the compound of the formula (3) takes place in a conventional manner, for instance in an aqueous medium at a temperature between −5° C. and +15° C. and at a pH below 2 by means of a strong acid, such as sulfuric acid or hydrochloric acid, and an alkali metal nitrite. The coupling reaction takes place in aqueous solution or in an aqueous-organic medium, in which case the organic solvent portion is water-miscible and inert toward the reactants, for example acetone, dimethylformamide, dimethyl sulfoxide and N-methylpyrrolidone. The coupling reaction generally takes place at a temperature between 0° and 20° C., preferably between 5° and 15° C., and at pH between 2 and 7, preferably between 4 and 6.

The fiber-reactive aniline starting compounds of the formula (3) are generally known and numerously described in the literature. The starting compound of the formula (4) used as coupling component, and its preparation, is known from U.S. Pat. No. 5,097,021 mentioned at the beginning.

The separation of the compounds of the formula (1) prepared according to the invention—hereinafter called compounds (1)—from the synthesis batches is effected by generally known methods either by precipitating from the reaction medium by means of electrolytes, for example sodium chloride or potassium chloride, or by evaporating the reaction solution, for example by spray drying, in which case this reaction solution may have a buffer substance added to it. The compounds (1) have fiber-reactive properties and very good dye properties. They can therefore be used for dyeing hydroxy- and/or carboxamido-containing material, in particular fiber material, and also leather. Similarly, the solutions produced in the synthesis of the compounds of the invention can be used for dyeing directly as liquid preparation, if desired after addition of a buffer substance and if desired after concentrating.

The present invention therefore also provides for the use of the compounds (1) for dyeing hydroxy- and carboxamido-containing materials, i.e. processes for their application to these substrates. Dyeing is to be understood as including mass coloration, for example polyamide films, and printing. The materials are preferably used in the form of fiber materials, particularly in the form of textile fibers, such as yarns, for example in the form of hanks, packages, and fabrics.

Hydroxy-containing materials are natural or synthetic hydroxy-containing materials, for example cellulose fiber materials or their regenerated products and polyvinyl alcohols. Cellulose fiber materials are preferably cotton but also other vegetable fibers, such as linen, hemp, jute and ramie fibers; regenerated cellulose fibers include for example staple viscose and filament viscose.

Carboxamido-containing materials include for example synthetic and natural polyamides and polyurethanes, in particular in the form of fibers, for example wool and other animal hairs, silk, leather, nylon-6,6, nylon-6, nylon-11 and nylon-4.

The compounds (1) can be applied to and fixed on the substrates mentioned, in particular on the fiber materials mentioned, by the techniques customary for water-soluble dyes, in particular for fiber-reactive dyes. For instance, on cellulose fibers they produce from a long liquor by the exhaust method and by means of various acid-binding agents with or without neutral salts, such as sodium chloride or sodium sulfate, dyeings having very good color yields and also excellent color build-up combined with high degrees of fixation. They are dyed at temperatures between 40° and 105° C., if desired at temperatures up to 120° C. under superatmospheric pressure, and if desired in the presence in the aqueous bath of customary dyeing assistants. One possible procedure is to introduce the material into the warm bath and to gradually heat the bath to the desired dyeing temperature and to complete the dyeing process at that temperature. The neutral salts which speed up the exhaustion of the compounds (1) can if desired not be added to the bath until after the actual dyeing temperature has been reached.

The padding process likewise produces excellent color yields with high degrees of fixation and a very good color build-up on cellulose fibers, on which fixing can be effected by batching at room temperature or elevated temperature, for example at up to about 60° C., by steaming or with dry heat in a conventional manner.

Similarly, the customary printing processes for cellulose fibers, which can be carried out either single-phase, for example by printing with a print paste containing sodium carbonate or some other acid-binding agent as well as the compound (1) and by subsequent steaming at 100° to 103° C., or two-phase, for example by printing with a neutral or weakly acid print paste containing the colorant and subsequent fixation either by passing the printed material through a hot electrolyte-containing alkaline bath or by overpadding with an alkaline electrolyte-containing padding liquor with a subsequent batching of this treated material or subsequent steaming or subsequent treatment with dry heat, produce strong prints with well-defined contours and a bright white ground. The appearance of the prints is not greatly affected by variations in the fixing conditions. Not only in dyeing but also in printing, the degrees of fixation obtained with the compounds (1) are very high.

When fixing by means of dry heat in accordance with the customary thermofix processes, hot air from 120° to 200° C. is used. In addition to the customary steam at 101° to 103° C. it is also possible to use superheated steam and high-pressure steam at temperatures of up to 160° C.

The acid-binding agents which effect the fixation of the compounds (1) on the cellulose fibers include for example water-soluble basic salts of the alkali metals and the alkaline earth metals of inorganic or organic acids as well as compounds which liberate alkali in the heat. Especially suitable are the alkali metal hydroxides and alkali metal salts of weak to medium inorganic or organic acids, the preferred alkali metal compounds being the sodium and potassium compounds. Such acid-binding agents include for example sodium hydroxide, potassium hydroxide, sodium carbonate, sodium bicarbonate, potassium carbonate, sodium formate, sodium dihydrogenphosphate, disodium hydrogenphosphate, sodium trichloroacetate, waterglass or trisodium phosphate.

By treating the compounds (1) with the acid-binding agents with or without heating, these compounds are chemically bonded to the cellulose fibers; especially the cellulose dyeings have after the customary aftertreatment by rinsing to remove unfixed portions of the compounds (1) excellent wetfastness properties, in particular since such unfixed portions are easily washed off on account of their good solubility in cold water.

The dyeings on polyurethane and polyamide fibers are customarily carried out from an acid medium. For instance, the dyebath may have added to it acetic acid and/or ammonium sulfate and/or acetic acid and ammonium acetate or sodium acetate in order to bring it to the desired pH. To achieve a usable levelness of the dyeing, it is advisable to add customary leveling aids, for example based on a reaction product of cyanuric chloride with three times the molar amount of an aminobenzenesulfonic acid and/or an aminonaphthalenesulfonic acid or based on a reaction product of for example stearylamine with ethylene oxide. Generally the material to be dyed is introduced at a temperature of about 40° C. into the bath, agitated therein for some time, the dyebath is then adjusted to the desired weakly acid, preferably weakly acetic acid, pH, and the actual dyeing is carried out at a temperature between 60° and 98° C. However, the dyeings can also be carried out at boiling point or at temperatures up to 120° C. (under superatmospheric pressure).

The dyeings and prints prepared with the compounds (1) are notable for bright shades. Especially the dyeings and prints on cellulose fiber materials have, as mentioned, in addition a high color strength, good lightfastness and very good wetfastness properties, such as wash, milling, water, sea water, cross-dyeing and perspiration-fast properties, also good fastness to pleating, hot pressing and rubbing.

Of particular note are the high degrees of fixation achievable with the dyes of the invention on cellulose fiber materials, which can be above 90% in the case of printing processes and pad-dyeing processes. A further advantage of the compounds (1) is the ease of washing off the portions which have not become fixed during printing or dyeing, as a result of which the washing of the printed or dyed cellulose fiber materials can be accomplished with low quantities of wash liquor with or without an energy-saving temperature regime during the washing process.

The Examples which follow illustrate the invention. Parts and percentages are by weight, unless otherwise stated. Parts by weight relate to parts by volume as the kilogram relates to the liter.

The compounds described in the Examples in terms of a formula are indicated in the form of the free acid; generally they are prepared and isolated in the form of their alkali metal salts, such as lithium, sodium or potassium salts, and used for dyeing in the form of their salts. Similarly, the starting compounds and components mentioned in the form of the free acid in the following Examples, in particular Table Examples, can be used in the synthesis as such or in the form of their salts, preferably alkali metal salts.

The absorption maxima ($\lambda_{max}$) in the visible region reported for the dyes of the invention were determined in aqueous solution using their alkali metal salts. In the Table Examples the $\lambda_{max}$ values are given in parenthesis in the hue column; the wavelength unit is nm.

EXAMPLE 1

To a pH 6 solution of 50.1 parts of the starting coupling component 1-(2'-morpholino-4'-fluoro-1',3',5'-triazin-6'-yl)amino-3,6-disulfo-8-hydroxynaphthalene in 500 parts of water is slowly added with thorough stirring over about 10 minutes a conventionally prepared aqueous, acidic diazonium salt suspension of 28.1 parts of 4-(β-sulfatoethylsulfonyl)aniline, and the coupling reaction is carried out at a temperature from 10° to 15° C. while maintaining a pH from 4 to 5. After about one hour the pH of the reaction batch is adjusted to 6 and the monoazo compound of the invention is isolated in a conventional manner, for example by spray drying or by salting out with sodium chloride.

The azo compound of the invention has, written in the form of the free acid, the formula

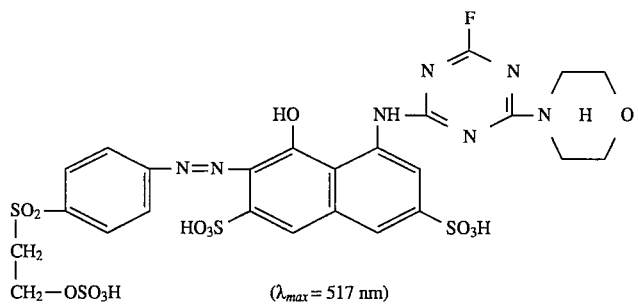

($\lambda_{max}$ = 517 nm)

The monoazo compound of the invention has very good fiber-reactive dye properties and dyes the materials mentioned in the description, in particular cellulose fiber materials, such as cotton, by the application and fixing techniques customary in the art for fiber-reactive dyes in bright red shades having good fastness properties, of which in particular the good light and water fastness properties can be singled out.

EXAMPLES 2 TO 19

The following Table Examples describe further novel monoazo compounds conforming to the formula (A)

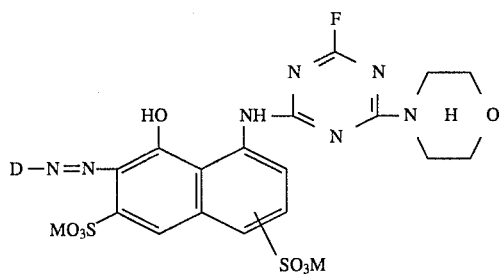

(where M is as defined for the formula (1)) in terms of their components. They can be prepared in the manner of the invention from the starting compounds evident from the formula (A) (the diazo component D-NH$_2$ conforming to the aniline compound of the formula (3), cyanuric fluoride, morpholine and 1-amino-3,6- or -4,6-disulfo-8-hydroxynaphthalene). They have very good fiber-reactive dye properties and dye the materials mentioned in the description, in particular cellulose fiber materials, in the hue indicated in the particular Table Example (here for cotton) in high color strength and good fastness properties.

| | Azo compound of formula (A) | | |
|---|---|---|---|
| Example | D | Position of —SO$_3$M | Hue |
| 2 | 4-Vinylsulfonylphenyl | meta | red (516) |
| 3 | 3-(β-Sulfatoethylsulfonyl)phenyl | meta | red (514) |
| 4 | 2-Sulfo-4-(β-sulfatoethylsulfonyl)phenyl | meta | red (510) |
| 5 | 2-Methoxy-5-(β-sulfatoethylsulfonyl)phenyl | meta | reddish violet (540) |
| 6 | 2-Hydroxy-5-(β-sulfatoethylsulfonyl)phenyl | meta | reddish violet (538) |
| 7 | 2,5-Dimethoxy-4-(β-sulfatoethylsulfonyl)phenyl | meta | reddish violet (537) |
| 8 | 2-Methoxy-5-methyl-4-(β-sulfatoethylsulfonyl)phenyl | meta | red (534) |
| 9 | 2-Chloro-5-(β-sulfatoethylsulfonyl)phenyl | meta | red (512) |
| 10 | 2-Carboxy-5-(β-sulfatoethylsulfonyl)phenyl | meta | red (513) |
| 11 | 4-Vinylsulfonylphenyl | para | red (513) |
| 12 | 3-(β-Sulfatoethylsulfonyl)phenyl | para | red |
| 13 | 2-Sulfo-4-(β-sulfatoethylsulfonyl)phenyl | para | red |
| 14 | 2-Methoxy-5-(β-sulfatoethylsulfonyl)phenyl | para | red |
| 15 | 2-Hydroxy-5-(β-sulfatoethylsulfonyl)phenyl | para | red |
| 16 | 2,5-Dimethoxy-4-(β-sulfatoethylsulfonyl)phenyl | para | red |
| 17 | 2-Methoxy-5-methyl-4-(β-sulfatoethylsulfonyl)phenyl | para | red |
| 18 | 2-Chloro-5-(β-sulfatoethylsulfonyl)phenyl | para | red |
| 19 | 2-Carboxy-5-(β-sulfatoethylsulfonyl)phenyl | meta | red (513) |

What is claimed is:

1. A monoazo compound conforming to the formula (1)

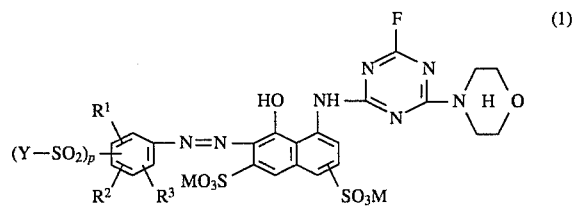

where

M is hydrogen or an alkali metal;

$R^1$ is hydrogen;

$R^2$ is hydrogen, alkyl of 1 to 4 carbon atoms, alkoxy of 1 to 4 carbon atoms;

$R^3$ is hydrogen, halogen, alkyl of 1 to 4 carbon atoms or alkoxy of 1 to 4 carbon atoms;

Y is vinyl or is ethyl which contains in the β-position a substituent which is eliminable with alkali to form a vinyl group;

p is 1 or 2;

the one —SO$_3$M group is attached to the naphthalene ring para or meta to the amino group.

2. A monoazo compound as claimed in claim 1, conforming to the formula

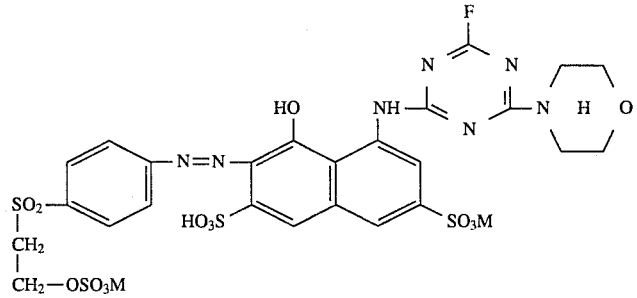

where M is hydrogen or an alkali metal.

3. A process for dyeing or printing hydroxy- and/or carboxamido-containing material, by applying a dye to the material and fixing the dye on the material by means of heat or with the aid of an alkaline agent or by means of both measures, which comprises the step of employing as a dye a monoazo compound of claim 1.

4. A process for dyeing or printing hydroxy- or carboxamido-containing material, comprising the steps of applying a monoazo compound as claimed in claim 1 to a hydroxy- or carboxamido-containing material, and fixing the monoazo compound to the material.

5. A process as claimed in claim 2, wherein the material is fiber material.

6. A process as claimed in claim 3, wherein the hydroxy- and/or carboxamido-containing material is fiber material.

* * * * *